May 3, 1949.　　　　　　　　E. J. JONES　　　　　　　2,468,933
CONVERTIBLE VELOCIPEDE
Filed Oct. 4, 1947　　　　　　　　　　　　　　　2 Sheets-Sheet 1
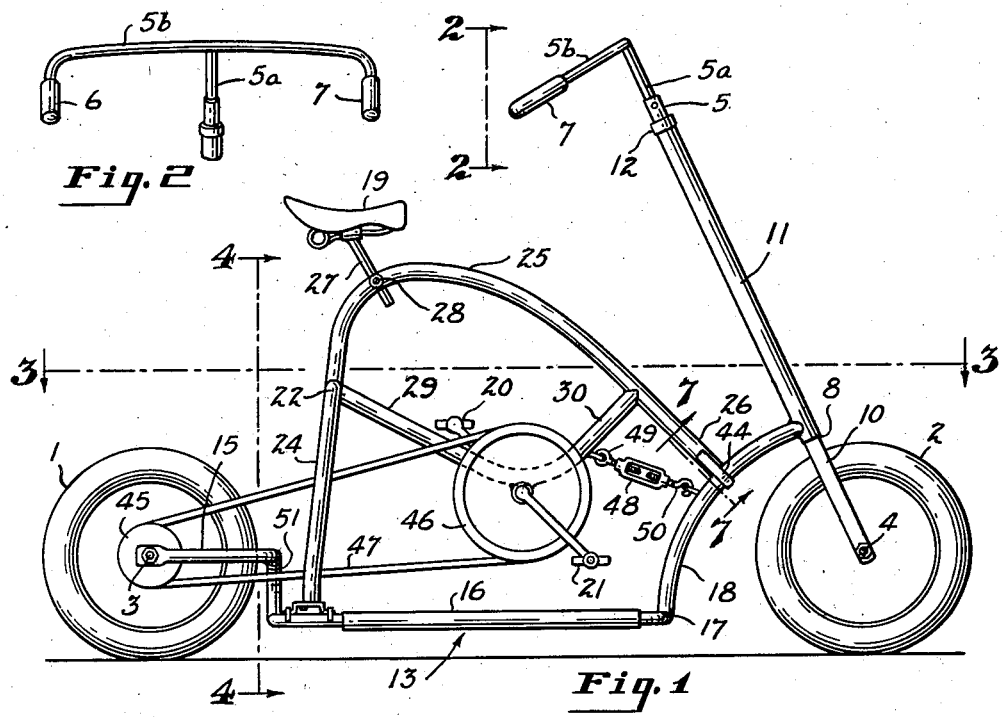
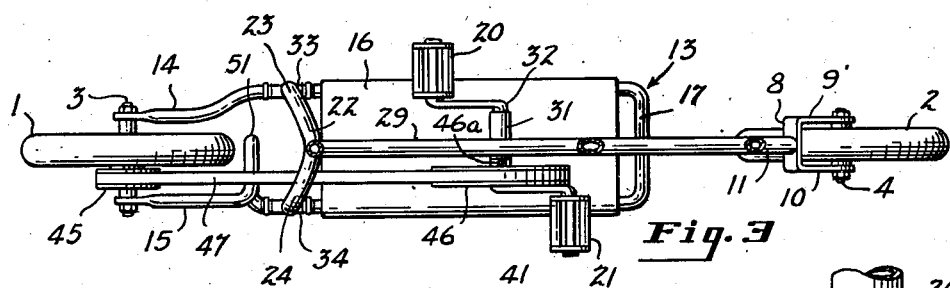
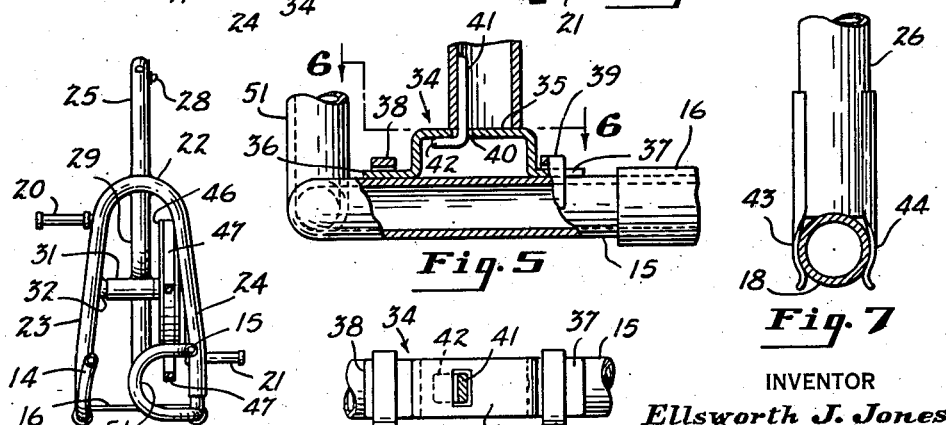
INVENTOR
Ellsworth J. Jones
BY John Mahoney
ATTORNEY May 3, 1949.    E. J. JONES    2,468,933
CONVERTIBLE VELOCIPEDE
Filed Oct. 4, 1947    2 Sheets-Sheet 2

INVENTOR
*Ellsworth J. Jones*
BY *John Mahoney*
ATTORNEY

Patented May 3, 1949

2,468,933

UNITED STATES PATENT OFFICE 2,468,933

CONVERTIBLE VELOCIPEDE

Ellsworth J. Jones, Willoughby, Ohio

Application October 4, 1947, Serial No. 777,893

11 Claims. (Cl. 280—7.15)

My invention relates to vehicles and more particularly to a vehicle that is adapted to be utilized either as a scooter or as a bicycle.

Because of its ease of manipulation, one of the most popular vehicles enjoyed by children of preschool age is the scooter. At an age ranging from four to six years, however, a child usually acquires a desire for a bicycle which is not only costly but it is difficult for some children to learn to ride a bicycle. Moreover, bicycles suitable for children ranging from four to six years of age usually become too small for them when they attain the age of eight to ten years and consequently a larger bicycle is necessary at that time.

It is the purpose of the present invention to provide an inexpensive vehicle having a base portion supported on wheels and an upper bicycle portion which is easily detachable therefrom to provide a scooter and in which the detachable portion may be easily attached to the base portion to provide a bicycle. In my improved structure no tools are required to attach the upper bicycle portion to the base portion or to detach it therefrom and the means associated with the upper bicycle portion and the lower base portion for attaching the bicycle portion to the base and detaching it therefrom are so simple that the bicycle portion may be easily secured in place or removed even by small children. The attachable portion of my improved vehicle is also constructed in such a manner that the bicycle provided by attaching it to the base portion may be ridden by either boys or girls and the parts of the vehicle are so constructed and arranged that a child of four to six years of age may easily learn to ride it as a bicycle.

It is therefore an object of the present invention to provide an improved vehicle that may be utilized either as a scooter or as a bicycle.

Another object of my invention is to provide an improved vehicle having a base portion and a bicycle portion which is easily detachable from the base portion to provide a scooter and in which the detached portion may be easily secured to the base portion to provide a bicycle.

A further object of my invention is to provide an improved vehicle that may be utilized either as a scooter or a bicycle and in which the parts are so arranged that it is easy for a child to learn to ride the vehicle as a bicycle.

My invention will be better understood by reference to the accompanying drawings in which:

Fig. 1 is an elevational view of my improved vehicle;

Fig. 2 is a detail view as seen from a plane passing through the line 2—2 of Fig. 1;

Fig. 3 is a sectional plan view on the line 3—3 of Fig. 1;

Fig. 4 is a sectional view on the line 4—4 of Fig. 1, looking in the direction of the arrows;

Fig. 5 is a detail view, with parts broken away to show adjacent structure and with parts in section, showing means for connecting the detachable bicycle portion to the base portion to form a bicycle;

Fig. 6 is a sectional view on the line 6—6 of Fig. 5, showing parts broken away and parts in section;

Fig. 7 is a sectional view as seen from a plane passing through the line 7—7 of Fig. 1, looking in the direction of the arrows.

Figure 8:
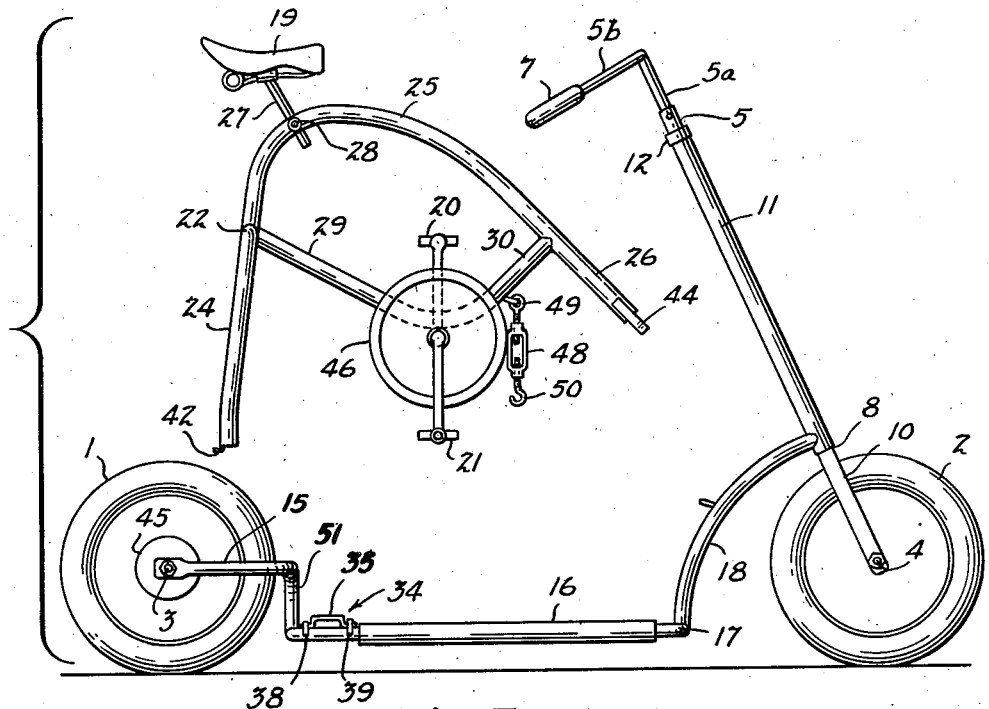
Fig. 8 is an elevational view of my improved vehicle showing the bicycle portion detached from the base portion.

As illustrated in the drawings, my improved vehicle comprises rear and front wheels 1 and 2 provided with axles 3 and 4, respectively, upon which the wheels are rotatable, a tubular steering rod 5 into the upper end of which is adjustably fitted a support 5a carrying the handle bar 5b which is provided with the usual hand grips 6 and 7. The lower end of the steering rod 5 terminates in a clevis 8, the arms 9 and 10 of which are secured to the opposite ends of axle 4 and surrounding steering rod 5 is a sleeve 11, the lower end of which abuts against clevis 8 and the upper end of which is held in place by suitable means, such as collar 12 secured to the steering rod 5.

In forming the base portion of my improved vehicle, wheels 1 and 2 are secured together by a frame generally designated by the numeral 13 which is supported by the wheels and is so constructed and arranged that the vehicle will be comparatively stable when utilized either as a scooter or as a bicycle. As illustrated, the frame 13 comprises opposite side members in the form of bars or tubes 14 and 15 which are attached adjacent their rear ends to the axle 3 and each of which has a portion extending downwardly and then forwardly to provide a support for a substantially flat foot rest 16 which extends between the tubes 14 and 15. The tubes 14 and 15 merge at their forward ends to provide a loop 17 and extending upwardly at approximately the center of the loop is an arcuate-shaped bar or tube 18 having one end secured to the loop and its opposite end secured to the sleeve 11. By arranging the central portion of the frame in such a manner, it will be apparent that a stable vehicle is provided as shown in the lower portion of Fig. 8 which may be utilized as a scooter when one foot of the operator is forced at an angle into engagement with the foot rest to propel the vehicle forward.

In accordance with my invention, means are provided which are attachable to the base portion just described to enable the vehicle to be easily and readily converted even by small children into a bicycle in which case the stability produced by arranging the central portion of the frame below the axles of the wheels is especially desirable and enables a small child to easily learn to ride it.

The portion attachable to the base consists of parts which form a support for a seat 19 and the foot pedals 20 and 21 and while the supports may be formed of tubular or solid material of any desirable shape, to lessen the weight, I preferably utilize tubular members. As illustrated in the drawings, a rear support is provided which is of a substantially inverted U-shape having an upper connecting loop 22 and downwardly extending legs 23 and 24 which are adapted to be supported by tubes 14 and 15 of frame 13 and welded or otherwise secured to the loop 22 is an arcuate-shaped support 25 which first extends upwardly and then forwardly and downwardly to such a position that its end 26 may be secured to the upwardly extending portion 18 of the frame. The seat 19 may be adjustably mounted upon support 25 in any desired manner. It may, for instance, be provided with a rod 27 which extends through an aperture in the support 25 and which may be held in any desired adjusted position by means of a set screw 28.

To provide a support for the pedals 20 and 21, a second support 29 is provided having one end secured to the lower portion of loop 22. As illustrated, support 29 is first bowed downwardly and then upwardly with its opposite end 30 being welded or otherwise secured to the downwardly extending portion of tubular member 25 and welded or otherwise secured to support 29 is a bearing 31 for receiving the central portion of a substantially Z-shaped rod or shaft 32, the opposite ends of which are bent at an angle thereto to form a support for pedals 20 and 21.

In accordance with my invention, means are provided to enable the detachable portion of the vehicle to be easily secured to and removed from the base portion even by small children and while any convenient means may be provided for this purpose, as illustrated in the drawings, frame members 14 and 15 are each provided with a bracket 33 and 34, respectively, each having an upwardly extending central portion 35 and horizontally extending flanges 36 and 37 which are movably held in slidable engagement with frames 14 and 15 by means of straps 38 and 39 which are welded or otherwise secured to opposite sides of frame members 14 and 15 and which permit limited longitudinal movement of the brackets.

As illustrated in the drawings, the central portion of each of the brackets is provided with an aperture 40 and each of the legs 23 and 24 is provided with a strip 41 welded or otherwise secured thereto at its inner periphery and which has a flange 42 extending rearwardly beyond the supports.

In applying the detachable portion to the base portion, it is held at such an angle that the flanges 42 of strips 41 are insertable in the apertures 40 and when each of the tubular members is straightened to the position shown in Fig. 1, the lower portion of each of the legs 23 and 24 rests upon the central portion 35 of its supporting bracket.

As the rear support is straightened to its operative position as shown in the drawings, means are provided on the lower portion 26 of the support 25 to engage frame member 18. For this purpose, a pair of spring clamps 43 and 44 which are welded or otherwise secured to the end portion 26 of support 25 are provided, each of which has an arcuate-shaped portion at its lower end to engage the opposite sides of frame portion 18.

To enable my improved vehicle to be propelled as a bicycle, a rotatable member 45 is secured to the hub of the rear wheel by any suitable means, such as welding and in a like manner a rotatable member 46 is provided with a hub which is secured to shaft 32 by any suitable means, such as a set screw 46a and arranged between the two rotatable members is a driving member 47. The rotatable members 45 and 46 may of course be in the from of sprocket wheels commonly utilized on bicycles in which case the driving member may be in the form of a chain. As shown, however, the rotatable members 45 and 46 are in the form of pulleys and the driving member 47 is in the form of a belt.

To tighten the belt 47 after it has been connected to pulleys 44 and 45, a turnbuckle 48 is provided, one end of which is provided with a hook 49 attached to a ring part welded or otherwise secured to the end 30 of support 29 and the other end of which is provided with a hook 50 secured to a ring part welded or otherwise secured to the frame part 18. When the turnbuckle is rotated in one direction, it exerts a force on support 29 to move brackets 34, legs 23 and 24 and supports 29 and 25 to the right as shown in Fig. 1 of the drawings, causing brackets 33 and 34 to engage straps 39 and clamps 43 and 44 to slide along rod 18, thus tightening belt 45. To remove the detachable part from the base portion to provide a scooter, the turnbuckle 48 is rotated in the opposite direction, thereby releasing the tension on belt 45. The portion 25 is then moved rearwardly, thereby removing clamping members 43 and 44 from the frame part 18 and further loosening belt 47 which may then be removed from pulleys 45 and 46. Support 22 may then be moved to such an angle that flanges 42 may be removed from the brackets.

In my improved structure, it will be particularly noted that frame member 15 is constructed in such a manner that belt 47 may be removed without removing frame member 15 from the axle. To provide such an arrangement, tubular member 15 is provided with an inwardly extending loop 51 as shown more particularly in Figs. 3 and 4 of the drawing and one portion of belt 47 extends through this loop. When turnbuckle 48 is rotated to loosen belt 47 and supports 22, 25 and 29 have been pushed rearwardly belt 47 may be easily removed from the vehicle. This particular feature constitutes one of the principal features of my invention because if it were necessary to remove frame member 15 to remove belt 47, it would be difficult for children to convert the scooter into a bicycle.

What I claim is:

1. A vehicle comprising rear and front wheels, a steering rod extending upwardly from the front wheel, a frame arranged between and supported by said wheels and providing a foot rest, a support attachable to and detachable from the frame, a seat mounted on said support, a pair of pedals rotatably secured to and arranged on opposite sides of said support, and means associated with said pedals and one of said wheels for driving said vehicle in response to the operation of said pedals, and said vehicle being movable as a scooter when said support is detached from the frame and one foot of an operator is forced at an angle into engagement with said foot rest.

2. A vehicle comprising rear and front wheels, a steering rod extending upward from the front wheel having a handle bar associated with its upper end, a sleeve surrounding said steering rod in which the steering rod is rotatable, a frame arranged between said wheels with one portion of said frame being supported by the rear wheel and the opposite portion being secured to said sleeve, a support detachably mounted at a plurality of points on said frame, a seat mounted on said support at an operative distance to the upper portion of said handle bar, foot pedals arranged on opposite sides of said support and being rotatably mounted on said support, means associated with said foot pedals and the rear wheel for driving the rear wheel to propel the vehicle in response to the operation of said pedals, and said vehicle being movable as a scooter when said support is detached from the base and one foot of an operator is forced at an angle into engagement with said foot rest.

3. A vehicle comprising rear and front wheels, a steering rod extending upwardly from the front wheel and supported thereby, a handle bar secured to the upper end of said steering rod, a sleeve surrounding said steering rod in which the steering rod is rotatable, a frame arranged between said wheels with one portion of said frame being supported by the rear wheel and the opposite portion being secured to said sleeve, a support detachably mounted at opposite sides of said frame adjacent the rear wheel and having a portion detachably secured to said frame adjacent said sleeve, a seat mounted on said support at an operative distance from the upper portion of said handle bar, foot pedals arranged on opposite sides of said support and being rotatably mounted thereon, means associated with said foot pedals and the rear wheel for driving the rear wheel to propel the vehicle during operation of said pedals, and said vehicle being movable as a scooter when said support is detached from said frame and one foot of an operator is forced at an angle into engagement with said foot rest.

4. A vehicle comprising rear and front wheels, a steering rod extending upwardly from the front wheel and supported thereby, a handle bar secured to the upper end of said steering rod, a frame arranged between and supported by said wheels and providing a foot rest, a support attachable to and detachable from the frame, a seat mounted on said support at an operative distance from the upper portion of said handle bar, foot pedals rotatably mounted on said support and being arranged on opposite sides of said support, means associated with said pedals and one of said wheels for driving said vehicle in response to the operation of said pedals, means whereby said support may be adjusted on said frame to tighten or loosen said driving means, and said vehicle being movable as a scooter when said support is detached from said frame and one foot of an operator is forced at an angle into engagement with said foot rest.

5. A vehicle comprising rear and front wheels, a steering rod supported by the front wheel and extending upwardly therefrom, a handle bar secured to said steering rod, a sleeve surrounding said rod in which the rod is rotatable, a frame arranged between said wheels with one portion of said frame being supported by the rear wheel and the opposite portion being secured to said sleeve, a support detachably mounted at opposite sides of said frame adjacent the rear wheel and having a portion detachably secured to said frame adjacent said sleeve, a seat mounted on said support at an operative distance from said handle bar, foot pedals rotatably mounted in said support and being arranged on opposite sides of said support, means rotatable with the foot pedals and means rotatable with the rear wheel, driving means arranged between the means rotatable with the rear wheel and the means rotatable with said pedals, means whereby said support may be adjusted on said frame to tighten or loosen said driving means and said vehicle being movable as a scooter when said support is detached from the frame and one foot of an operator is forced at an angle into engagement with said foot rest.

6. A vehicle comprising rear and front wheels, a steering rod extending upwardly from the front wheel, an axle for supporting each of said wheels, a frame arranged between and supported by said wheels and having a central portion arranged below the axles of said wheels, a support attachable to and detachable from the frame, a seat mounted on said support, a pair of pedals rotatably secured to and arranged on opposite sides of said support, and means associated with said pedals and one of said wheels for driving said vehicle in response to the operation of said pedals, and said vehicle being movable as a scooter when said support is detached from the frame and one foot of an operator is forced at an angle into engagement with said foot rest.

7. A vehicle comprising rear and front wheels, a steering rod extending upwardly from the front wheel, a sleeve surrounding said steering rod in which the steering rod is rotatable, an axle for supporting each of said wheels, a frame arranged between and supported by said wheels, said frame being composed of side members having their rear ends connected to the opposite ends of the axle for the rear wheel and a front portion connected to said sleeve, and a central portion arranged below the axles of said wheels, a support attachable to and detachable from the frame, a seat mounted on said support, a pair of pedals rotatably secured to and arranged on opposite sides of said support, and means associated with said pedals and one of said wheels for driving said vehicle in response to the operation of said pedals, and said vehicle being movable as a scooter when said support is detached from the frame and one foot of an operator is forced at an angle into engagement with said foot rest.

8. A vehicle comprising rear and front wheels, a steering rod extending upwardly from the front wheel, a frame arranged between and supported by said wheels and providing a foot rest, said frame including oppositely disposed side members, one of which is provided with an inwardly extending loop, a support detachably mounted on said frame, a pair of pedals rotatably secured to and arranged on opposite sides of said support, rotatable means associated with said pedals, and means associated with said rotatable means and one of said wheels for driving said vehicle in response to the operation of said pedals and a portion of said driving means being movable within the inwardly extending loop provided by one of said side frames to thereby permit said driving member to be removed from said rotatable means without removing either of said side members.

9. A vehicle comprising rear and front wheels, a steering rod extending upwardly from the front wheel, an axle for supporting each of said wheels, a frame arranged between and supported by the rear axle and the front wheel and including oppositely disposed side members, one of which is provided with an inwardly extending loop, a support attachable to and detachable from the frame, a seat mounted on said support, a pair of pedals rotatably secured to and arranged on opposite sides of said support, a rotatable member associated with said pedals and a rotatable member associated with said rear wheel, driving means arranged between the rotatable members for transferring power from the pedals to the rear wheel, and a portion of said driving means being movable within the inwardly extending loop of one of the side frames to thereby permit said driving member to be removed from the rotatable members without removing either side frame.

10. A vehicle comprising rear and front wheels, each provided with an axle, a steering rod secured to the front axle and extending upwardly from the front wheel, a sleeve surrounding said steering rod in which the steering rod is rotatable, a frame arranged between said wheels, said frame being composed of first and second side members having their rear ends connected with the opposite ends of the axle of the rear wheel and a front portion connected to said sleeve and the second side member having an inwardly extending loop, a support attachable to and detachable from said frame, including a yoke having downwardly extending legs, one of which is secured to the second side frame member outwardly of said loop, a pair of pedals rotatably secured to and arranged on opposite sides of said support, rotatable means associated with the rear wheel and rotatable means associated with said pedals, and driving means arranged between said rotatable means which extends between the legs of said yoke and one portion of which is arranged within said loop.

11. A vehicle comprising rear and front wheels, a steering rod operatively associated with the front wheel and supported thereby, a sleeve surrounding said steering rod in which the steering rod is rotatable, a frame arranged between said wheels having a portion supported by the rear wheel and an arcuate-shaped front tubular portion secured to said sleeve, a support detachably mounted on opposite sides of said frame adjacent the rear wheel and having a portion detachably secured to the front tubular portion of said frame, foot pedals rotatably mounted on said support and being arranged on opposite sides of said support, means associated with said pedals and one of said wheels for driving said vehicle in response to the operation of said pedals, means whereby said support may be adjusted on said frame to tighten or loosen said driving means and the portion of the support which engages the front tubular portion of said frame being slidable thereon during adjustment, and said vehicle being movable as a scooter when said support is detached from said frame and one foot of an operator is forced at an angle into engagement with said foot rest.

ELLSWORTH J. JONES.

REFERENCES CITED

The following references are of record in the file of this patent:

UNITED STATES PATENTS

| Number | Name | Date |
| --- | --- | --- |
| 1,965,194 | Koch | July 3, 1934 |